United States Patent
Guo et al.

(10) Patent No.: US 11,691,904 B2
(45) Date of Patent: Jul. 4, 2023

(54) HYPER-RATE ANAEROBIC DIGESTION SYSTEM FOR ENHANCED BIO-SOLIDS REDUCTION

(71) Applicant: Nanyang Technological University, Singapore (SG)

(72) Inventors: Chenghong Guo, Singapore (SG); Yogananda Maspolim, Singapore (SG); Yan Zhou, Singapore (SG); Wun Jern Ng, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 16/604,284

(22) PCT Filed: Apr. 11, 2018

(86) PCT No.: PCT/SG2018/050185
§ 371 (c)(1),
(2) Date: Oct. 10, 2019

(87) PCT Pub. No.: WO2018/190775
PCT Pub. Date: Oct. 18, 2018

(65) Prior Publication Data
US 2020/0048121 A1 Feb. 13, 2020

(30) Foreign Application Priority Data
Apr. 11, 2017 (SG) .............. 10201702995T

(51) Int. Cl.
*C02F 3/28* (2023.01)
*C02F 3/34* (2023.01)

(52) U.S. Cl.
CPC .............. *C02F 3/286* (2013.01); *C02F 3/341* (2013.01); *C02F 2203/004* (2013.01); *C02F 2301/106* (2013.01)

(58) Field of Classification Search
CPC .... C02F 3/286; C02F 3/341; C02F 2203/004; C02F 2301/106; C02F 11/04; C02F 2209/02; C02F 2301/08; C02F 3/28
(Continued)

(56) References Cited

U.S. PATENT DOCUMENTS

| 4,696,746 A | 9/1987 | Ghosh et al. |
| 5,525,229 A * | 6/1996 | Shih ........................ C02F 3/286 |
| | | 210/603 |

(Continued)

FOREIGN PATENT DOCUMENTS

| CN | 102583933 A | 7/2012 |
| CN | 103613261 A | 3/2014 |
| EP | 0282473 A1 | 9/1988 |

OTHER PUBLICATIONS

International Search Report and the Written Opinion for International Application No. PCT/SG2018/050185 dated Jul. 9, 2018, 10 pages.

(Continued)

*Primary Examiner* — Claire A Norris
(74) *Attorney, Agent, or Firm* — Patterson + Sheridan, LLP

(57) ABSTRACT

Disclosed herein is a process for the treatment of wastewater for biosolids reduction and biogas (i.e. methane) generation where a wastewater is provided to a first reactor which is operated under anaerobic conditions, a hydraulic/solids retention time of from 0.1 to 1 day, a temperature of from 30 to 70° C. and a pH of from 6.5 to 10, with the effluent of the first reactor passing to a second reactor which is operated under anaerobic conditions, a hydraulic/solids retention time of from 3 to 10 days and a temperature of from 30 to 70° C. The process may further comprise feeding an effluent produced from the second reactor to a third reactor operated (Continued)

under anaerobic conditions, a hydraulic/solids retention time of from 3 to 20 days and a temperature of from 30 to 70° C.

10 Claims, 1 Drawing Sheet

(58) Field of Classification Search
USPC .......................................................... 210/613
See application file for complete search history.

(56) References Cited

U.S. PATENT DOCUMENTS

| | | | |
|---|---|---|---|
| 6,673,243 B2* | 1/2004 | Srinivasan | C12M 23/34 210/532.2 |
| 8,414,770 B2* | 4/2013 | Smith | C02F 11/04 210/603 |
| 2003/0034300 A1 | 2/2003 | Srinivasan et al. | |
| 2009/0107913 A1 | 4/2009 | Johnson | |
| 2010/0014919 A1 | 1/2010 | Resler | |
| 2012/0009643 A1 | 1/2012 | Hafez et al. | |
| 2013/0137153 A1* | 5/2013 | Elbeshbishy | C12M 41/12 435/168 |
| 2013/0260433 A1* | 10/2013 | Zhang | C12M 45/06 435/167 |
| 2013/0309740 A1* | 11/2013 | Yu | C12M 41/26 435/167 |
| 2014/0062137 A1 | 3/2014 | Marchesano et al. | |

OTHER PUBLICATIONS

Ho et al. "Effects of Temperature and Hydraulic Retention Time on Acetotrophic Pathways and Performance in High-Rate Sludge Digestion," Environmental Science & Technology, vol. 48, No. 11, May 5, 2014, pp. 6468-6476, <https://doi.org/10.1021/es500074j>.

Ho, D. P. et al., Methanosarcinaceae and Acetate-Oxidizing Pathways Dominate in High-Rate Thermophilic Anaerobic Digestion of Waste-Activated Sludge, Environ. Microbiol. 2013, 6491-6500, 79.

Chinese Office Action in related applciation CN201880038894.X dated Sep. 16, 2021.

* cited by examiner

HYPER-RATE ANAEROBIC DIGESTION SYSTEM FOR ENHANCED BIO-SOLIDS REDUCTION

FIELD OF INVENTION

This invention relates to a wastewater treatment process that can effectively treat a wastewater within a short solids/hydraulic retention time.

BACKGROUND

The listing or discussion of a prior-published document in this specification should not necessarily be taken as an acknowledgement that the document is part of the state of the art or is common general knowledge.

Anaerobic digestion has been widely used for sewage sludge treatment due to its potential for biosolids reduction and biogas generation. Anaerobic digestion of sewage sludge includes hydrolysis, acidogenesis, acetogenesis and methanogenesis, with different microbial consortia being involved in each process. Hydrolysis is often the rate-limiting step in the whole process. The enrichment and maintenance of robust methanogens, which are slow growing organisms, in the anaerobic system is important, and operation of anaerobic sludge digestion at too short a solids retention time (SRT) can result in the washout of these slow growing methanogens. Such a washout may cause process failure leading to accumulation of volatile fatty acids (VFAs) and a reduction of the pH, leading to further inhibition of methanogenesis. Therefore, anaerobic digestion of sewage sludge in a single stage high-rate anaerobic digester is typically conducted using a hydraulic retention time (HRT) of from 15 to 30 days, with a HRT of more than 20 days being preferred in practice to achieve 30-40% volatile solids (VS) reduction. Such high HRTs result in larger digester volumes and hence more land area is required, which leads to higher capital costs.

Methanogenesis from acetate can follow two different pathways: direct acetate cleavage by aceticlastic methanogens and syntrophic acetate oxidation (SAO). The SAO pathway involves the oxidation of acetate to $H_2$ and $CO_2$, mediated by the acetate oxidizer, followed by hydrogenotrophic methanogenesis. The acetate oxidation process is endergonic at standard conditions (0° C. and 1 atm pressure) and the consumption of hydrogen by hydrogenotrophic methanogens, such as *Methanomicrobiales* (MMB) and *Methanobacteriales* (MBT) and aceticlastic methanogens (*Methanosarcinaceae* (MSC)), maintains a low hydrogen pressure that is important for the process to proceed.

The hydrolysis process can be enhanced by pre-treatment methods to disintegrate the sludge and microbial cell structure. This has the effect of improving sludge digestion, dynamics and efficiency. Ultrasonication, ozone oxidation, alkaline treatment, and enzyme treatments have been developed. Alkaline treatment, which is easy to operate and has high efficiency, is most commonly used. However, the high pH conditions created by alkaline dosing (pH 10-12) in the pre-treatment may inhibit the subsequent methanogenesis process. Given this, pH neutralization using acid after alkaline pre-treatment is necessary in practice. However, the high cost associated with dosing the sludge with alkali and then with acid limits the application of the alkaline pretreatment process in large scale waste water treatment plants (WWTPs). An alternative approach involves the enhanced hydrolysis of sewage sludge at high temperatures, ranging from 60 to 270° C. A two-phase anaerobic process, using optimized hydrolysis and acidogenesis conditions in separate reactors has also been tested for sewage sludge digestion. This two-phase process uses a first phase reactor operating at a pH of from 5 to 6 (i.e. under acidic conditions) to conduct the hydrolysis, followed by a second phase reactor operating under methanogenesis conditions. It should be noted that the above pre-treatments would all typically result in enhanced anaerobic sludge digesters operating with a HRT of longer than 12 days under mesophilic conditions.

The existing anaerobic systems for enhanced sewage sludge digestion are typically operated with a HRT of more than 20 days, which results in larger digester volumes and capital costs. Alkaline pretreatment by the addition of alkali to maintain a pH of from 10 to 12 can achieve high hydrolysis efficiency and enhanced digestion efficiency, but the high chemical dosage of alkali and acid used for pH adjustment is costly at full-scale application. Ozone oxidation, ultrasonication and enzyme treatments are also costly. The control of acidic conditions in phase-I of a 2-phase system may potentially suffer from inhibition caused by the free VFAs at high organic loading values, and our operating experience has also demonstrated the relatively low hydrolysis efficiency of sewage sludge under acidic conditions. The reported sludge digestion in a single digester operated under thermophilic conditions and short HRT of 4 days is not stable and had to be managed very expertly to maintain any sort of stability. Process failure could occur very quickly and inhibition from seemingly common substrates is also an issue (see Ho et al., *Environ. Sci. Technol.* 2014 (48), pp 6468-6476).

SUMMARY OF INVENTION

In a first aspect of the invention, there is provided a wastewater treatment process, comprising providing a wastewater to a first reactor having a first set of operating conditions and supplying an effluent produced from the first reactor to a second reactor having a second set of operating conditions, wherein:

(a) the first set of operating conditions includes anaerobic conditions, a hydraulic/solids retention time of from 0.1 to 1 day, a temperature of from 30 to 70° C. and a pH of from 6.5 to 10; and (b) the second set of operating conditions includes anaerobic conditions, a hydraulic/solids retention time of from 3 to 10 days and a temperature of from 30 to 70° C.

In embodiments of the invention:

(a) the first set of operating conditions may have a pH that is maintained in a range of from 7.0 to 9.0, such as from 8.5 to 9.0; and/or (b) the first set of operating conditions may have a hydraulic/solids retention time of from 0.3 of a day to 1 day; and/or (c) the second set of operating conditions may have:
  (i) a hydraulic/solids retention time of from 3 to 6.5 days; and/or
  (ii) the first and second reactor have a combined hydraulic/solids retention time of from 3.1 to 8 days, such as from 3.3 to less than 8 days; and/or (d) the volume ratio of the first reactor volume to second reactor volume may be from 1:5 to 1:20, such as from 1:8 to 1:15, such as 1:10.

In yet further embodiments of the invention, the first and/or second set of operating conditions may be operated at a mesophilic (i.e. from 30 to 45° C.) temperature or at a thermophilic (i.e. from 41 to 70° C., such as from 46 to 70°

C., or such as from 46 to 55° C.) temperature. It will be appreciated that the first and second reactors may be operated entirely independently with regard to temperature, such that the first reactor may be operated under mesophilic temperature conditions, while the second reactor is operated under thermophilic temperature conditions, or both first and second reactors are operated under mesophilic or thermophilic temperature conditions.

In certain embodiments of the invention, the process may further comprise feeding an effluent produced from the second reactor to a third reactor operating under a third set of operating conditions, which conditions include anaerobic conditions, a hydraulic/solids retention time of from 3 to 20 days and a temperature of from 30 to 70° C. (i.e. mesophilic or thermophilic). It will be appreciated that the third reactor's temperature may be selected independently from the first and second reactor's temperature as discussed above. When present, the hydraulic/solids retention time of the third reactor may be from 3 to 8 days, such as from 4 to 7 days and/or the volume ratio of the second reactor volume to third reactor volume is from 1:1 to 1:8, such as from 1:1 to 1:7. In particular embodiments of the invention, the third reactor may be present when the combined hydraulic/solids retention time of the first and second reactors is less than 8 days.

In embodiments of the invention:
(a) a microbial seed is continually or periodically fed into the first reactor during operation, optionally wherein the microbial seed is obtained from the second reactor and/or third reactor; and/or
(b) the first reactor may be a continuous stirred-tank reactor.

In yet further embodiments of the invention, the process may provide conditions:
(a) in the first reactor that are adapted to provide a population of bacteria enriched in *Proteiniborus, Flavobacteriaceae, Tissierella, Acholeplasma* and *Pseudomonas*; and/or
(b) in the second reactor and, when present, the third reactor that are adapted to provide a population of bacteria enriched in aceticlastic methanogens from the *Methanosarcinaceae* genus, hydrogenotrophic methanogens, unclassified *Bacteroidetes, Flavobacteriaceae, Clostridium* IV, and *Sphaerochaeta*; and/or
(c) in the first, second and, when present, third reactors such that they are substantially free of slow growing aceticlastic methanogens from the *Methanosaetaceae* genus.

In still further embodiments of the invention:
(I) the total hydraulic/solids retention time of the process is from 3.1 to 11 days, such as from 6 to 10 days; and/or
(II) the first, second and, when present, third reactors are separate vessels or one or more of the reactors are housed within a single vessel to form individual chambers separated by baffles (e.g. concentric baffles).

For the avoidance of doubt any technically sensible combination of the above embodiments is contemplated.

DRAWINGS

DESCRIPTION

Figure 1:
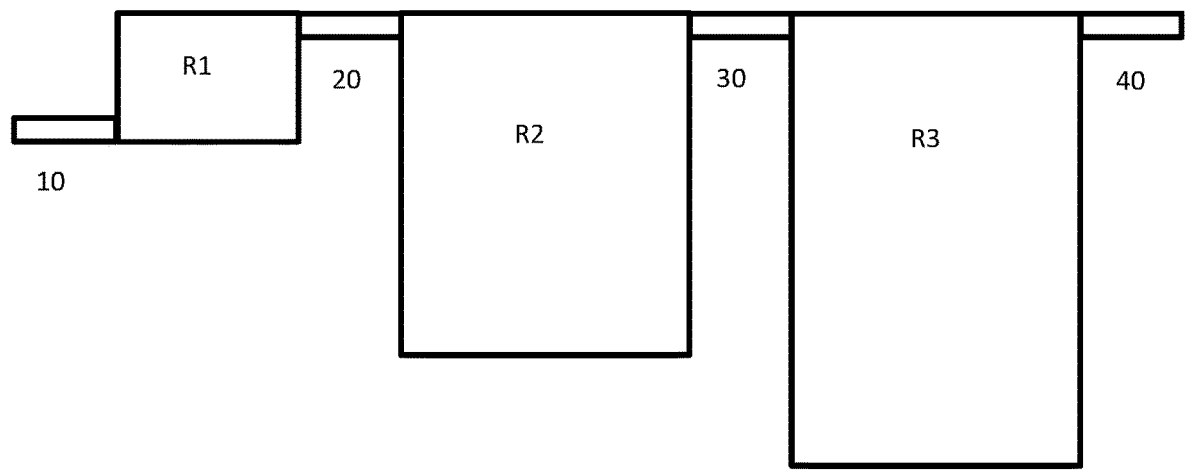
FIG. 1 depicts a hyper-rate process according to the currently described invention.

It has been surprisingly found that one can effectively treat a wastewater within a shortened solids/hydraulic retention time of less than 20 days through the application of harsh selection pressures in a pre-treatment step and at least one full anaerobic treatment step. This is particularly surprising when mesophilic temperature conditions are used. In order to deal with organic materials that are harder to break down, a final polishing step may be added to the process.

Disclosed herein is a hyper-rate anaerobic system comprising a small leading chamber, a hyper-rate digester/chamber followed by an optional high rate digester/chamber for polishing purposes. The chamber/s and digester/s can be physically separated or integrated into a single vessel using (e.g. concentric) baffles. The flow from the leading chamber into the digesters can be achieved by over-flow or pumping. The small leading chamber is designed for enhanced hydrolysis and acidogenesis. The soluble simple organic compounds produced (mainly VFAs) are carried into the hyper-rate digester and used as substrates to select and enrich specific methanogens from seed sludge. Stable and fast methanogenesis is expected in the hyper-rate digester due to the specific and robust methanogens selected. These acclimate their community structure and metabolic pathways in response to the short HRT selection pressure. The optional polishing digester is intended to further digest the organics that are more difficult to degrade.

When used herein, the terms "hyper-rate" and "high-rate" refers to the speed of reaction taking place within a reactor and/or treatment system and thus refers to the conditions of the process within a reactor and/or treatment system, rather than defining the reactor and/or treatment system itself. When the term "hyper-rate" is applied to an individual reactor herein, it may cover a hydraulic/solids retention time (H/SRT) of from 0.1 to 10 days (e.g. from 0.1 to 5 days, such as from 0.3 to 3 days). When the term "high-rate" is applied to an individual reactor herein, it may refer to a H/SRT of from 3 to 20 days (e.g. from 3 to 10 days, such as from 3 to 7 days). It will be noted that there may be overlap between the term "high-rate" and "hyper-rate" as used herein. When the term "hyper-rate" is applied to the overall process, it may refer to a H/SRT of from 3.1 to 23.1 days, more particularly it may refer to a H/SRT of from 3.1 to 11 days, such as from 6 to 10 days.

Given the above, the speed of the various treatment stages governed by the conditions applied to each reactor is more important than the size of the individual reactors themselves. As will be appreciated, when the reaction conditions are set up so as to allow fast reaction times (i.e. fast H/SRT) compared to conventional systems (typically over 20 days), the size of the reactors needed will also decrease in size relative to those used in a conventional plant to treat the same amount of wastewater. For example, when referred to herein, the term "small leading chamber" refers to a first reactor that is smaller in comparison to the second reactor (called a hyper-rate reactor above). The relative size difference measured in terms of volume may be from 1:5 to 1:20 between the volume of the small (first) reactor and the hyper-rate (second) reactor. By analogy, a hyper-rate reactor may have a volume ratio compared to a high rate reactor of from 1:1 to 1:8.

Thus, the invention disclosed herein relates to a wastewater treatment process, comprising providing a wastewater to a first reactor having a first set of operating conditions and supplying an effluent produced from the first reactor to a second reactor having a second set of operating conditions, wherein:

(a) the first set of operating conditions includes anaerobic conditions, a hydraulic/solids retention time of from 0.1 to 1 day, a temperature of from 30 to 70° C. and a pH of from 6.5 to 10; and (b) the second set of operating conditions includes anaerobic conditions, a hydraulic/solids retention time of from 3 to 10 days and a temperature of from 30 to 70° C.

In embodiments herein, the word "comprising" may be interpreted as requiring the features mentioned, but not limiting the presence of other features. Alternatively, the word "comprising" may also relate to the situation where only the components/features listed are intended to be present (e.g. the word "comprising" may be replaced by the phrases "consists of" or "consists essentially of"). It is explicitly contemplated that both the broader and narrower interpretations can be applied to all aspects and embodiments of the present invention. In other words, the word "comprising" and synonyms thereof may be replaced by the phrase "consisting of" or the phrase "consists essentially of" or synonyms thereof and vice versa.

When used herein, the term "wastewater" refers to a source of water that comprises one or more pollutants. As used herein, "pollutant" refers to carbonaceous and other undesirable substances present in the wastewater, such as biological, organic and other waste matter, though it particularly relates to biological and organic waste matter. These substances are undesirable as they would cause problems if present in high levels in the wastewater that is discharged into the environment or discharged from the wastewater treatment system. In the case of municipal wastewater, the pollutants may include dissolved and suspended waste matter such as fecal matter, organic acids, fibres and the like. In other types of wastewater such as industrial wastewater, the pollutants may include specific by-products or waste products from the industrial process in question, for example fine paper fibres. As the person skilled in the art will appreciate, the present invention is applicable to a range of wastewater types and the meaning of "pollutants" will therefore vary contextually.

It will be appreciated that the wastewater mentioned may be an organic wastewater that generally comprises biodegradeable solids. For example, the organic waste may be a sludge, food waste, oily waste, solid waste with a high organic content or any combination thereof. In certain embodiments, the sludge may be a waste activated sludge. In general, the organic waste contains a total solids concentration of from greater than or equal to 3 g/L to less than or equal to 50 g/L.

"Anaerobic conditions" refer to reactor phases in which no oxygen is supplied to the microbe populations under culture. Dissolved oxygen levels may change gradually during these phases as oxygen is used up by the growing microbes. In this context, maintaining dissolved oxygen levels at about zero during the anaerobic phase is to be understood as supplying no oxygen to the microbe population under culture and allowing the dissolved oxygen level to drop to about zero, for example below detection levels of standard dissolved oxygen sensors used in wastewater treatment methods.

The temperature range of from 30 to 70° C. in the first and second reactors covers both mesophilic (i.e. from 30 to 45° C.) and themophilic (i.e. from 41 to 70° C. or, more particularly, from 46 to 70° C.) temperature conditions. As noted above, the first and second reactors may operate independently with regard to temperature, such that the first reactor may operate under mesophilic conditions, while the second reactor operates under thermophilic conditions or vice versa. Alternatively, both the first and second reactors may operate using thermophilic or mesophilic temperature conditions.

As noted above, the pH of the first reactor may be maintained at a value of from 6.5 to 10. However, it will be appreciated that particular sub-ranges within this range may be preferred, such as a pH range of from 7.0 to 9.0, such as from 8.5 to 9.0. It is noted that maintaining the pH of the first reactor in the range of from 7.0 to 9.0 or, more particularly, in the range of from 8.5 to 9.0, there is no need to use temperatures over 45° C. in any of the three reactors. That is, using a pH of range of from 7.0 to 9.0 or, more particularly, from 8.5 to 9.0 enables a mesophilic temperature conditions to be used in all reactors used in the current hyper-rate process (i.e. the first, second and, when present, third reactor). Suitable mesophilic temperature ranges may be those mentioned herein or, more particularly, a temperature range of from 30 to 40° C., such as from 30 to 37° C., such as 35° C. For example, the system may operate using a temperature of from 30 to 37° C. (e.g. 33 to 35° C.) in all reactors of the process, with a pH of from 8.5 to 9.0 in the first reactor.

The overall system referred to herein may be described as a hyper-rate anaerobic system. The hyper-rate anaerobic system described herein consists of a small chamber (i.e. first reactor or leading chamber) and a hyper-rate digester/chamber (i.e. second reactor). The latter chamber may optionally be followed by a high-rate digester/chamber (also described herein as a third reactor) for polishing purposes. The terms "high-rate" and "hyper-rate" are as defined above. The chambers/digesters can be separate vessels or they may be integrated into a single vessel using (e.g. concentric) baffles. The flow from one chamber/digester to the next can be by over-flow or pumping.

As noted herein, the first reactor (or lead chamber) may have a fast S/HRT of from 0.1 to 1 day (e.g. 0.3 to 1 day). As such, it displays a much quicker S/HRT than the second reactor, which has a S/HRT of from 3 to 10 days. As a consequence of this arrangement, the physical size of the first reactor may be much smaller than the second reactor, as the material within the first reactor spends comparatively little time therein. As such, the volume ratio of the first reactor volume to second reactor volume may be from 1:5 to 1:20, such as from 1:8 to 1:15, such as 1:10.

In the initial set-up of the reactor system described herein, the seed sludge (e.g. drawn from a WWTP's single-stage anaerobic sludge digester) is filled into each of the small leading chamber and the subsequent chambers/digesters. Following the initial set-up, a "seed" (i.e. a sludge containing microbes) may be continually or periodically fed into the small leading chamber, which seed may come from a WWTP's single-stage anaerobic sludge digester or from the second and/or third reactor of the currently described system itself. The small leading chamber is designed to select for enhanced hydrolysis and acidogenesis. That is, the controlled operating conditions such as mixing (e.g. mechanical), and more particularly, the pH, temperature, and short HRT (i.e. from 0.1 to 1 day, such as from 0.3 to 1 day) promote the enrichment of the desired microbial community that has enhanced hydrolysis and acidogenesis. The resulting soluble compounds, including VFAs, sugars, and amino acids produced in the leading chamber by the selected-for bacteria are then carried into the hyper-rate chamber/digester. The controlled operating conditions (including a short HRT, i.e. from 3 to 10 days, such as from 3 to 6.5 days, such as 3 days) therein promote for the selection and enrichment of microbes capable of additional hydrolysis and acidogenesis of the feed from the leading chamber. The feed from the leading chamber (first reactor) also has substantial quantities of VFAs that are suitable substrates for methanogens, and so this promoted the enrichment of specific methanogens in this second chamber. The short HRT selection pressure in both the leading chamber and the second chamber would washout slow growing *Methanosaetaceae* (MST), while hydrogenotrophic methanogens such as *Methanomicrobiales* (MMB) and *Methanobacteriales* (MBT) and aceticlastic methanogens (e.g. *Methanosarcinaceae* (MSC)) would be retained and thus enriched in the second chamber/hyper-rate reactor. The combined S/HRT for the first and second reactors described above may be from 3.1 to 11 days, more particularly from 3.1 to 8 days, such as from 3.3 to less than 8 days (e.g. 3.3 to 6 days, such as 3.3. days).

Methanogens generally include aceticlastic methanogens, methylotrophic methanogens and hydrogenotrophic methanogens during anaerobic sludge digestion. *Methanosaetaceae* (MST) and *Methanosarcinaceae* (MSC) belong to the group of aceticlastic methanogens. *Methanosaetaceae* (MST) is a strict aceticlastic methanogen, which has a slow growth rate. In contrast, the aceticlastic methanogen *Methanosarcinaceae* (MSC) and the hydrogenetrophic methanogens (e.g. *Methanomicrobiales* (MMB) and *Methanobacteriales* (MBT) which consume hydrogen to produce methane) have a relatively higher growth rate than *Methanosaetaceae* (MST). This difference in growth rates make the selection and enrichment of the desired microbial communities in the hyper-rate reactor system described here possible by providing suitable substrates and proper process control. Methane generation from acetate contributes around two thirds of the total methane production.

Methanogenesis of acetate in the hyper-rate digester (i.e. second reactor) can follow the direct acetate cleavage pathway mediated by *Methanosarcinaceae* (MSC), and the SAO pathway achieved by syntrophic relationships between syntrophic acetate oxidizer (SAO) and hydrogenotrophic methanogens such as *Methanomicrobiales* (MMB) and *Methanobacteriales* (MBT). Consequently, volatile solids solubilization coupled with methane generation can be achieved in the hyper-rate digester chamber (i.e. second reactor) operated under relatively harsh conditions (short HRT/SRT). The optional additional high rate digester (i.e. third reactor) is designed for further polishing and the enriched microbial populations from hyper-rate digester/chamber are carried into polishing digester/chamber to develop a robust community capable of hydrolysis, acidogenesis, acetogenesis and methanogenesis of the residual more difficult to degrade organic materials.

As will be appreciated from the above, the reactors operating the process may be substantially free of slow growing aceticlastic methanogens (i.e. bacteria from the *Methanosaetaceae* genus) following the initial set-up phase of operation (e.g. from 10 to 40 days). When used herein, the term "substantially free" means that the microbial population contains less than 10%, such as less than 5%, such as less than 1%, such as less than 0.5%, such as less than 0.1%, such as less than 0.0001% of a sample of the microbial population following the initial set-up phase of the wastewater reaction process described herein.

When a third reactor is present, it may operate under a third set of conditions which may include anaerobic conditions, a hydraulic/solids retention time of from 3 to 20 days and a temperature of from 30 to 70° C. As will be appreciated, the temperature conditions in the third reactor may be mesophilic or thermophilic and this is independent of the temperature conditions in the first and second reactors. While any suitable H/SRT may be selected from 3 to 20 days, a particular S/HRT range that may be mentioned herein for the third reactor is a S/HRT of from 3 to 8 days, such as from 4 to 7 days. As noted above, the inclusion of a third reactor in the process is optional. For example, when the total H/SRT within the first and second reactors is or exceeds 8 days, there may not be any need for a third reactor. Thus, the inclusion of a third reactor in the process may be particularly useful when the combined hydraulic/solids retention time of the first and second reactor is less than 8 days.

When present, the third reactor may have the same size or be bigger than the second reactor. The size may be determined by the S/HRT of the second and third reactors, which may be the same, or the third reactor may have a longer S/HRT than the second reactor, thus requiring a larger volume for the third reactor. Given this, the volume ratio of the second reactor volume to third reactor volume may be from 1:1 to 1:8, such as from 1:1 to 1:7.

One advantage of the current process is that it may be operated with a fast total H/SRT, such that the total hydraulic/solids retention time of the process may be from 3.1 to 11 days, such as from 6 to 10 days. Such a processing time is surprising for processes including one or more reactors/digesters operating under mesophilic conditions.

Any suitable reactor may be used for the first to third reactors. For example, the first reactor may be a continuous stirred-tank reactor.

Figure 2:
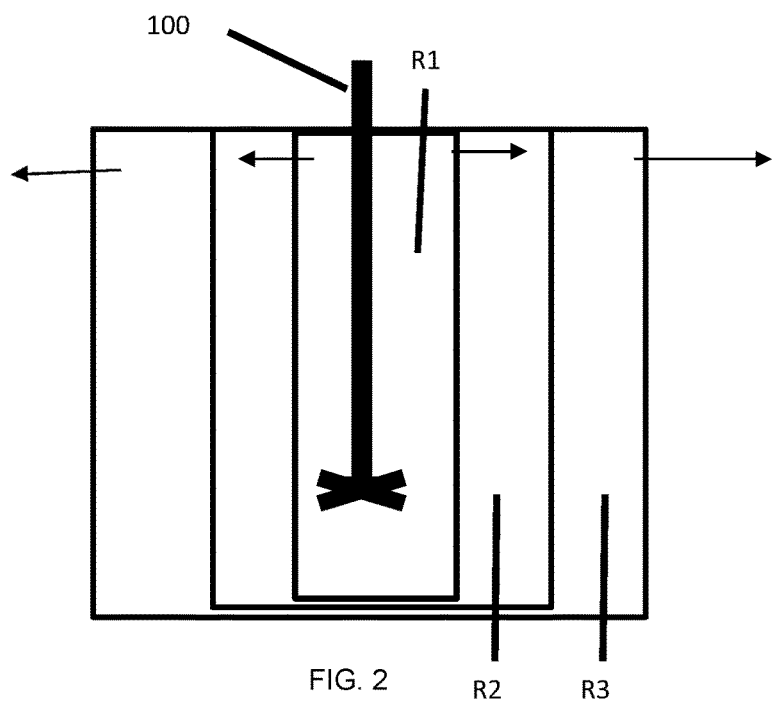
FIG. 2 depicts an alternative arrangement of the reactor system that may be used in the process described herein.

FIG. 1 discloses a hyper-rate anaerobic system suitable for use in the current invention, which system comprises a small leading chamber (R1) and a hyper-rate digester/chamber (R2), which may optionally be followed by a high rate digester/chamber (R3) for polishing purposes. The chambers/digesters can be separate vessels or integrated into a single vessel, though they are illustrated here as separate vessels for the purposes of illustration. FIG. 2 shows a similar system, where a single reactor contains three separate chambers (also labelled R1 to R3 by analogy to FIG. 1) separated by baffles, with a central mechanical stirrer 100 in the first chamber (R1). The arrows in FIG. 2 show the direction of travel from the central, small leading chamber (R1), through the digester (R2), to the polishing chamber (R3).

The small leading chamber (R1) selects for enhanced hydrolysis and acidogenesis by controlling the operating conditions, such as mixing (e.g. mechanical), pH (alkaline pretreatment, pH 9), temperature and short HRT (from about 0.1 to 1 day, such as from 0.2 to 0.5 days, such as about 0.3 days), in order to promote the enrichment of the desired microbial community that has enhanced hydrolysis and acidogenesis. An inlet 10 allows ingress of the wastewater and, if needed, a microbial seed as discussed herein. The resulting soluble compounds, including VFAs (volatile fatty acids), sugars and amino acids produced in R1 are then carried into the hyper-rate chamber/digester (R2), which may be accomplished by overflow or by pumping. The controlled operating conditions in this second reactor promote selection and enrichment of microbes capable of additional hydrolysis and acidogenesis of the feed from the leading chamber (R1). Indeed, the feed from the leading chamber (R1) help to promote the enrichment/selection of specific methanogens in this second chamber and also act as suitable substrates for the selected-for methanogens in R2. A short HRT in R2 (from around 3 to 10 days, e.g. from 3 to 5 days, such as around 3 days) applies a selection pressure that would wash out slow growing methanogens, while hydrogenotrophic methanogens (such as, *Methanomicrobiales* and *Methanobacteriales* (MBT) and aceticlastic methanogens (*Methanosarcinaceae* (MSC)) would be retained and thus enriched in R2. Consequently, volatile solids solubilisation, coupled with methane biogas generation can be achieved in R2. The following optional high rate digester (R3) is intended for further polishing, i.e. the enriched microbial populations in R2 are carried into R3 (which may have an HRT of from around 3 to 20 days, or more particularly of from around 5 to 10 days, such as around 7 days) to develop a robust community capable of hydrolysis, acidogenesis, acetogenesis and methanogenesis of the residual (more difficult to degrade) organic materials.

In this hyper-rate anaerobic system, enhanced hydrolysis and acidogenesis in R1 can be achieved, which produces the VFAs needed as a substrate to enrich the hydrogenotrophic methanogens and aceticlastic methanogens in the following hyper-rate R2 and/or R3 digesters. Consequently, a more efficient and stable digestion performance can be achieved at a total short HRT of from about 3.3 to 11 days, such as from about 6 to 10 days (it typically takes more than 20 days in existing 2-stage anaerobic digester systems).

As noted above, the hyper-rate anaerobic system disclosed herein achieves enhanced hydrolysis and acidogenesis in a small leading chamber, which produced the VFAs as substrate to enrich the hydrogenotrophic methanogens such as *Methanomicrobiales* (MMB) and *Methanobacteriales* (MBT), and aceticlastic methanogens (e.g. *Methanosarcinaceae* (MSC)) in the subsequent hyper rate digester. Thus, both the direct acetate oxidation pathway and the syntrophic acetate oxidation (SAO) followed by hydrogentrophic methanogenesis pathway involving in acetate oxidation to produce methane are possible. The specific microbial community structure associated with their specific metabolic pathways is developed in the hyper-rate digester. Consequently, the system can achieve high rates, and an efficient and stable digestion performance. The hyper-rate anaerobic system can be operated at short HRT of from about 6 to 10 days to achieve stable and good digestion efficiency.

Further operational details of the process are provided below.

1. The small chamber, hyper-rate digester and polishing digester can be physically separated or integrated into a single vessel using (e.g. concentric) baffles. The mixture flows from the small leading chamber into the following chamber digesters by over-flow or pumping. The small leading CSTR chamber is designed for bacterial community selection and enhancement for hydrolysis and acidogenesis. The HRT/SRT of the leading chamber is from 0.3 to 1 day, and the temperature can range from 30–70° C. The microbial seed can be periodically or continuously drawn from the downstream anaerobic digester or from an external source (e.g. activated sludge from a conventional anaerobic wastewater treatment place). Operating pH is preferably controlled between 7.0 and 9.0 (e.g. from 8.5 to 9.0). The occasional addition of alkali, such as sodium hydroxide, maybe necessary for pH control, but controlling the pH within a narrow range is not necessary, though it may be beneficial in certain circumstances in order to ensure that mesophilic temperatures may be used in all reactors of the system. The dosing of alkali to the small leading chamber is typically done automatically with a pH controller and dosing pump system. If the chamber is operated at a high temperature of from 55 to 70° C., the addition of alkali may not be necessary. It is noted that a high temperature may cause issues with regard to the stability of the reaction system unless handled with expert care.

2. For the following hyper-rate digester/chamber, HRT/SRT is typically maintained at from 3 to 8 days. The temperature can be maintained at either mesophilic or thermophilic temperature conditions and pH control in the digester is typically not necessary, as it is expected to self-stabilize at from 7.2 to 7.6.

3. For the optional following polishing digester chamber, the HRT/SRT is typically from 3 to 20 days. The temperature can be maintained at either mesophilic or thermophilic condition. The polishing digester maybe not be necessary if the total HRT/SRT of the leading chamber and hyper-rate digester/chamber is 8 days or longer; pH control in the polishing digester is typically not necessary, as it is expected to self-stabilize at from 7.2 to 7.6.

4. During the initial selection and enrichment period, the accumulation of VFAs up to 7000 mg COD/L in the hyper-rate digester/chamber, especially when the hyper-rate digester is operated at a short HRT of 3 days, could be observed due to the relatively low methanogen numbers therein at initiation. A high concentration of accumulated VFAs is desirable during the initiation phase, as this helps to select for dominance of hydrogenotrophic methanogens (such as *Methanomicrobiales* (MMB) and *Methanobacteriales* (MBT)) and aceticlastic methanogens (*Methanosarcinaceae* (MSC)). A stable and enriched microbial population can typically be developed in the hyper-rate digester/chamber within 35 days.

5. After selection and acclimation, the bacterial community in the mesophilic small leading chamber can be expected to be enriched with *Proteiniborus, Flavobacteriaceae, Tissierella, Acholeplasma* and *Pseudomonas*. *Proteiniborus* are fermentative bacteria, producing mainly acetic acid, hydrogen and carbon dioxide by using proteins as the fermentative substrate, these bacteria can tolerate a pH range of from 6 to 10. *Flavobacteriaceae* are fermentative bacteria that are mainly capable of utilizing carbohydrates. *Tissierella* grow optimally under mesophilic conditions and produce acetic, butyric, and iso-valeric acids and prefer an optimum pH of 8.3. *Acholeplasma* is a facultative anaerobe that produces organic acids for the methanogenesis step. *Pseudomonas* is capable of producing proteases and is relevant to protein hydrolysis during the enhanced sludge digestion process. It is expected that a similar bacterial population would be obtained using a small leading chamber operating under thermophilic temperature conditions.

6. The bacterial community in the hyper-rate digester and polishing digester can be expected to be: Unclassified *Bacteroidetes, Flavobacteriaceae, Clostridium* IV, and *Sphaerochaeta*. *Bacteroidetes* show higher hydrolytic activities in protein and carbohydrate degradation. *Clostridium* IV is composed of multiple species that display a variety of phenotypic characteristics. For example, *Clostridium ultunense* is a mesophilic syntrophic acetate oxidizing organism. *Sphaerochaeta* is a chemoheterotrophic anaerobe, growing on carbohydrate to produce acetate, formate and ethanol as end products during glucose fermentation. *Syntrophomonas*, which is a butyric acid oxidizer, is expected to be predominant both in the hyper-rate digester and polishing digester (when present), while *Smithella* (a propionic acid oxidizer), will only be found in the polishing digester when this is present as part of the system.

7. The methanogen community in the hyper-rate digester and polishing digester is dominated by aceticlastic methanogens (*Methanosarcinaceae* (MSC)) and hydrogenotrophic methanogens (*Methanoculleus*). Slow growing aceticlatic methanogens (e.g. *Methanosaetaceae* (MST)) are washed out and not detected in both the hyper-rate digester and the polishing digester (when present). *Methanosarcinaceae* consumes both acetate and hydrogen. *Methanoculleus* belongs to the *Methanomicrobiales* (MMB) genus. Thus, methanogenesis of acetate in the hyper-rate digester and polishing digester could possibly include direct acetate cleavage by *Methanosarcinaceae* (MSC) and through the syntrophic acetate oxidation (SAO) pathway, which is achieved by syntrophic interactions between the syntrophic acetate oxidizer *Clostridium* with *Methanosarcinaceae* (MSC) and/or *Methanoculleus*.

This invention would be suitable for application in various solids/sludges organic waste digestion, such as the organic fraction of municipal solid waste, food wastes, sewage sludges, and organic industrial sludges. This process could be used for organic waste stabilization coupled with bioenergy recovery. High solids reduction associated with energy recovery can be achieved with this invention. The invention can work as a retrofit to existing facilities at a wastewater treatment plant and so avoid need for complete reconstruction of existing treatment facilities. In a retrofit scenario, the addition of this invention can also serve to expand the treatment capacity of the existing facility and hence avoiding the need for expansion of existing treatment facilities as needs increase.

EXAMPLES

Example 1

A hyper rate system described herein was employed to treat municipal sludge on a laboratory scale. The system was operated at a combined HRT of 10 days (0.3 days in leading chamber (first reactor), 3 days in hyper-rate digester (second reactor) and about 6.7 days in polishing digester (in third reactor)) under mesophilic conditions (maintained at around 35° C.) in all three reactors. The pH of the first reactor was maintained in a range of from 8.5 to 9.0. The VS reduction efficiency was 43±5.8%, and methane production yield was 0.275±0.029 L/g VS feed or 0.640±0.094 L/g VS removed.

Example 2

A second reaction system was set up which different from that in Example 1 because the total HRT was 6.3 days (0.3 days in leading chamber, 3 days in hyper-rate digester and 3 days in polishing digester) under mesophilic conditions (maintained at around 35° C.) in all three reactors. The pH of the first reactor was maintained in a range of from 8.5 to 9.0. The VS reduction efficiency maintained at 36.7±2.4%, and methane production yield was 0.211±0.016 L/g VS feed or 0.658±0.106 L/g VS removed.

The invention claimed is:

1. A wastewater treatment process, comprising providing a wastewater to a first reactor having a first set of operating conditions, supplying an effluent produced from the first reactor to a second reactor having a second set of operating conditions, and feeding an effluent produced from the second reactor to a third reactor operating under a third set of operating conditions, wherein:
    (a) the first set of operating conditions includes anaerobic conditions, a hydraulic and solids retention time of from 0.1 to 1 day, a temperature of from 30 to 40° C. and a pH of from 8.5 to 9;
    (b) the second set of operating conditions includes anaerobic conditions, a hydraulic and solids retention time of from 3 to 6.5 days and a temperature of from 30 to 40° C.; and
    (c) the third set of operating conditions include anaerobic conditions, a hydraulic and solids retention time of from 3 to 10 days and a temperature of from 30° C. to 40° C.;
    (d) the volume ratio of the first reactor volume to second reactor volume is from 1:8 to 1:15, and the volume ratio of the second reactor volume to third reactor volume is from 1:1 to 1:8.

2. The process according to claim 1, wherein the first and second reactors have a combined hydraulic and solids retention time of from 3.1 to 7.5 days.

3. The process according to claim 1, wherein the hydraulic and solids retention time of the third reactor is from 3 to 8 days.

4. The process according to claim 1, wherein a microbial seed is continually or periodically fed into the first reactor during operation.

5. The process according to claim 4, wherein the microbial seed is obtained from one or both of the second reactor and the third reactor.

6. The process according to claim 1, wherein the first reactor is a continuous stirred-tank reactor.

7. The process according to claim 1, wherein the conditions in the first reactor are adapted to provide a population of bacteria enriched in *Proteiniborus, Flavobacteriaceae, Tissierella, Acholeplasma* and *Pseudomonas*.

8. The process according to claim 1, wherein the conditions in the second and third reactors are adapted to provide a population of bacteria enriched in aceticlastic methanogens from the *Methanosarcinaceae* genus, hydrogenotrophic methanogens, unclassified *Bacteroidetes, Flavobacteriaceae, Clostridium* IV, and *Sphaerochaeta*.

9. The process according to claim 1, wherein:
    (a) the conditions in the first, second and third reactors are substantially free of slow growing aceticlastic methanogens from the *Methanosaetaceae* genus; or
    (b) the total hydraulic and solids retention time of the process is from 3.1 to 11 days.

10. The process according to claim 1, wherein:
    (a) the first, second and third reactors are separate vessels or one or more of the reactors are housed within a single vessel to form individual chambers separated by baffles; or
    (b) the hydraulic and solids retention time in the first set of operating conditions is from 0.3 to 1 day.

\* \* \* \* \*